United States Patent [19]

Chiang et al.

[11] 4,438,379

[45] Mar. 20, 1984

[54] METHOD OF DAMPING A STEPPING MOTOR

[75] Inventors: David Chiang, Dix Hills; Mosi Chu, Setauket; Solomon Manber, Sands Point, all of N.Y.

[73] Assignee: MSS Associates, Short Hills, N.J.

[21] Appl. No.: 273,625

[22] Filed: Jun. 15, 1981

[51] Int. Cl.³ .......................................... G05B 19/40
[52] U.S. Cl. .................................... 318/685; 318/696
[58] Field of Search .............. 318/138, 254, 611, 632, 318/633, 685, 696

[56] References Cited

U.S. PATENT DOCUMENTS 4,107,594  8/1978  Jacobs ................................. 318/685
4,349,770  9/1982  Ragen ................................. 318/685

*Primary Examiner*—Stanley J. Witkowski
*Attorney, Agent, or Firm*—Hane, Roberts, Spiecens & Cohen

[57] ABSTRACT

For a stepping motor having a rotatable stator magnetic field for driving the rotor, there is disclosed a method of damping the oscillations of the rotor which occurs when the rotatable stator magnetic field is stopped upon arriving at a desired rotational position by measuring quantities related to the instantaneous velocity of the rotor due to the oscillations of the rotor about the desired rotational position, rotationally displacing the stator magnetic field from the desired rotational position in a direction opposite to the direction of the oscillation, and thereafter returning the stator magnetic field to the desired stopping position.

11 Claims, 6 Drawing Figures

ANALOG TO DIGITAL VELOCITY VALUE CONVERTER—ADV

METHOD OF DAMPING A STEPPING MOTOR

BACKGROUND OF THE INVENTION

This invention pertains to stepping motors and, more particularly, to the damping of the oscillations that occur when a stepping motor is stopped at a desired position.

There are many times when it is required to rapidly and precisely position a rotatable member. Two of the more common applications are in the rotation of a lead screw to rectilinearly position a member and also in the rotation of a print element such as a "daisy wheel" to select characters. Heretofore, the precise positioning of such members was accomplished by the utilization of complex and expensive servo systems incorporating DC motors. However, there is disclosed in U.S. Pat. No. 4,215,302 methods and apparatus for driving a rotatable member by merely using a stepping motor which is energized by particular current waveforms. Thus, the complexity and expense is minimized since inexpensive stepping motors without complex servo systems can be employed. While the methods and apparatus shown in said patent are eminently satisfactory for many uses, it has been found that at the time of stopping there is a small oscillation of the rotor. In U.S. Pat. No. 3,947,742 there is another approach to solving the same problem of a motor driving a load. This approach in addition to many practical problems, does not take into account the second order effects which cause, at the time of stopping, the same small oscillations. While, for many uses, these oscillations are insignificant, there are occasions when the application demands a very rapid damping of such oscillations.

BRIEF SUMMARY OF THE INVENTION

It is accordingly a general object of the invention to damp such oscillations in a stepping motor.

Briefly, the invention contemplates damping the oscillations of the rotor of a stepping motor which has been driven and stopped at a desired rotational position by the rotatable stator magnetic field. The method contemplates a first step of measuring quantities related to the instantaneous velocity of the rotor due to the oscillations thereof about the desired rotational position at the time of stopping; a second step of rotationally displacing the stator magnetic field from the desired stopping position in a direction opposite to the direction of oscillation; and a third step of thereafter returning the stator magnetic field to the desired stopping position.

According to the presently preferred embodiment of the invention, the quantities which are measured are a sequence of rotational positions of the rotor, and the displacement of the stator magnetic field is related to the magnitude of such measured quantities. Thereafter, the returning of the stator magnetic field to the desired stopping position is performed in a set of the first and second steps wherein the measurements are performed and the displacement made so that there is a iterative convergence to the desired stopping position.

According to another embodiment of the invention, the displacement of the second step is a function of the amplitudes of the oscillations and the third step is performed at a time related to the period of oscillations.

According to a third embodiment of the invention, the initial displacement is by a fixed amount; however, the amplitude of the stator magnetic field is a function of measured quantities. In this third embodiment, the return of the stator magnetic field to the desired position can be iteratively stepwise as in the preferred embodiment or, as a fourth embodiment, can be based on the amplitude and period of the oscillation of the second embodiment.

There is also disclosed as a feature of the invention improved apparatus for measuring the velocity of a moving member such as the rotor of a stepping motor.

BRIEF DESCRIPTION OF THE DRAWING

Other objects, the features and advantages of the invention will be apparent from the following detailed description when read with the accompanying drawing which shows, by way of example and not limitation, apparatus for realizing the presently preferred embodiment of the invention.

DETAILED DESCRIPTION OF THE EMBODIMENTS OF THE INVENTION

When the stator magnetic field of a stepping motor stops at a desired rotation position, the rotor still has kinetic energy proportional to its moment of inertia and the square of its velocity. Furthermore, the magnetic flux lines of the field acting on the rotor can be considered as a spring coupling the stator to rotor. Thus, as the rotor continues to rotate after the stopping of stator magnetic field an oscillatory system is set up which can be represented by a ball in a cup-shaped potential well. In the present case, the ball runs up the wall of the well when the field stops, reaches a maximum and runs down and up the other side. If now one can shift the position of the well with respect to the ball, one can cause the ball to start climbing the opposite wall when it would normally be running down the first side of the wall, then the rolling of the ball will be damped. Thus, it is possible for the ball to stop at a selected position before it again reverses direction. If this selected position is the desired position for stopping, then one only need again move the position of the well so that at this stopping of the ball, the ball is at the bottom of the well with zero velocity. The invention exploits this phenomenon by realizing that the potential well is a magnetic potential well established by the stator magnetic field and that the rotor is the ball. Thus, the shifting of the potential well is accomplished by rotating the stator magnetic field.

In essence, the invention is that, at the point of stopping, effectively moving the potential well to dissipate kinetic energy and after the energy is dissipated returning the well to the home position. In one embodiment the well has a constant shape (the walls have a given slope) and the dissipation and return are effectively continuous; in another embodiment, the well has a constant shape, the dissipation continuous, and the return is a step; in a further embodiment, the well has a variable shape (the slope of the wall varies), the dissipation is continuous, and the return is effectively continuous; and as a still further embodiment, the well shape is variable and the return is a step.

Before describing the invention, there will be dscribed a stepping motor system.

Figure 1:
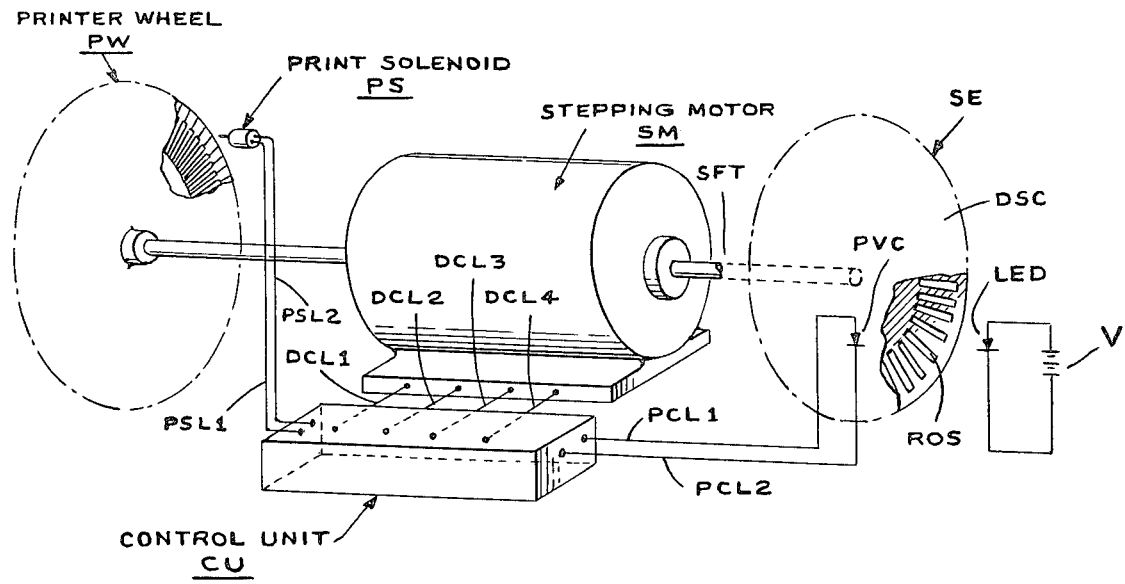
FIG. 1 is a generalized diagram of a printer system utilizing the invention.

In FIG. 1 the printer system is seen centered around the stepping motor SM having the shaft SFT and controlled by the control unit CU. Affixed to one end of the shaft SFT is the print wheel PW. The print wheel PW is of the daisy wheel type in that it has a plurality of radial spokes. At the end of each spoke is a character. The print wheel is positioned opposite a record medium and platen (not shown). Opposite the print position of the wheel there is a print solenoid PS. In operation the control unit CU sends stepping currents via the lines DCL1 to DCL4 to step the motor to a desired position. Accordingly, the motor rotates causing the spokes of the print wheel PW to move past the print solenoid PS. When the proper character is correctly aligned and the motor stops oscillating, the control unit CU fires the print solenoid PS which drives the then positioned character against the ribbon, record-medium, plate combination. While the shaft is rotating the shaft encoder SE fixed to the other end of the shaft SFT sends positioning signals back to the control unit CU.

Figure 2:
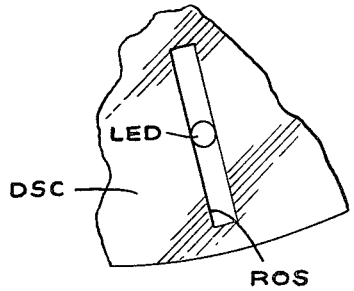
FIG. 2 is a fragmentary view of the shaft encoder of FIG. 1.

In particular, the shaft encoder SE includes an opaque disc DFC having a plurality of radially extending slots such as slot ROS. See also FIG. 2. These slots are in one-to-one correspondence with the spokes of the print wheel PW and in registration therewith. Straddling the disc DSC in the region of the slots are the light emitting diode LED and the photovoltaic cell PVC. The diode and cell are so aligned that light from the diode will pass through a slot ROS to the photovoltaic cell PVC. Thus, as the shaft rotates the shaft encoder SE sends pulse signals back via the lines PCL1 and PCL2 to the control unit CU. A typical pulse signal is shown as the pulse signals PSA of waveform I in FIG. 3. The pulse signal starts at the leading edge of the slot ROS and ends at the trailing edge of that slot. The invention contemplates utilizing the amplitude of this signal to determine the actual instantaneous angular position of the slot at any time during the oscillations.

Figure 3:
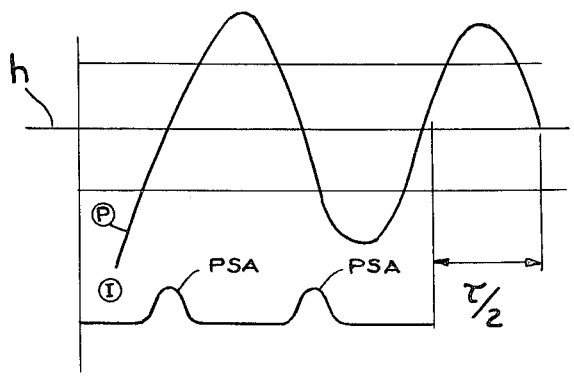
FIG. 3 is an enlargement of the output signal from the transducer of the encoder of FIG. 1.

In operation, the control unit CU initiates operation of the stepping motor SM causing the print wheel to rotate to the desired character. When the wheel reaches the desired character the control unit CU discontinues the application of stepping current via lines DCL1 to DCL4 to the motor, and the motor stops. However, it does not stop immediately but oscillates about a home position. Accordingly, as can be seen in FIG. 3, waveform P shows the oscillation of the print wheel about this home position h. The oscillation is such that the particular slot ROS modulates the light beam to form the series of pulses PSA shown in waveform I. The signal represented by this waveform is periodically sampled to generate a velocity value which is used to damp the oscillations. When the amplitude of the oscillations is below a certain value recognized by the velocity value approaching zero, the print solenoid PS is fund.

Figure 4:
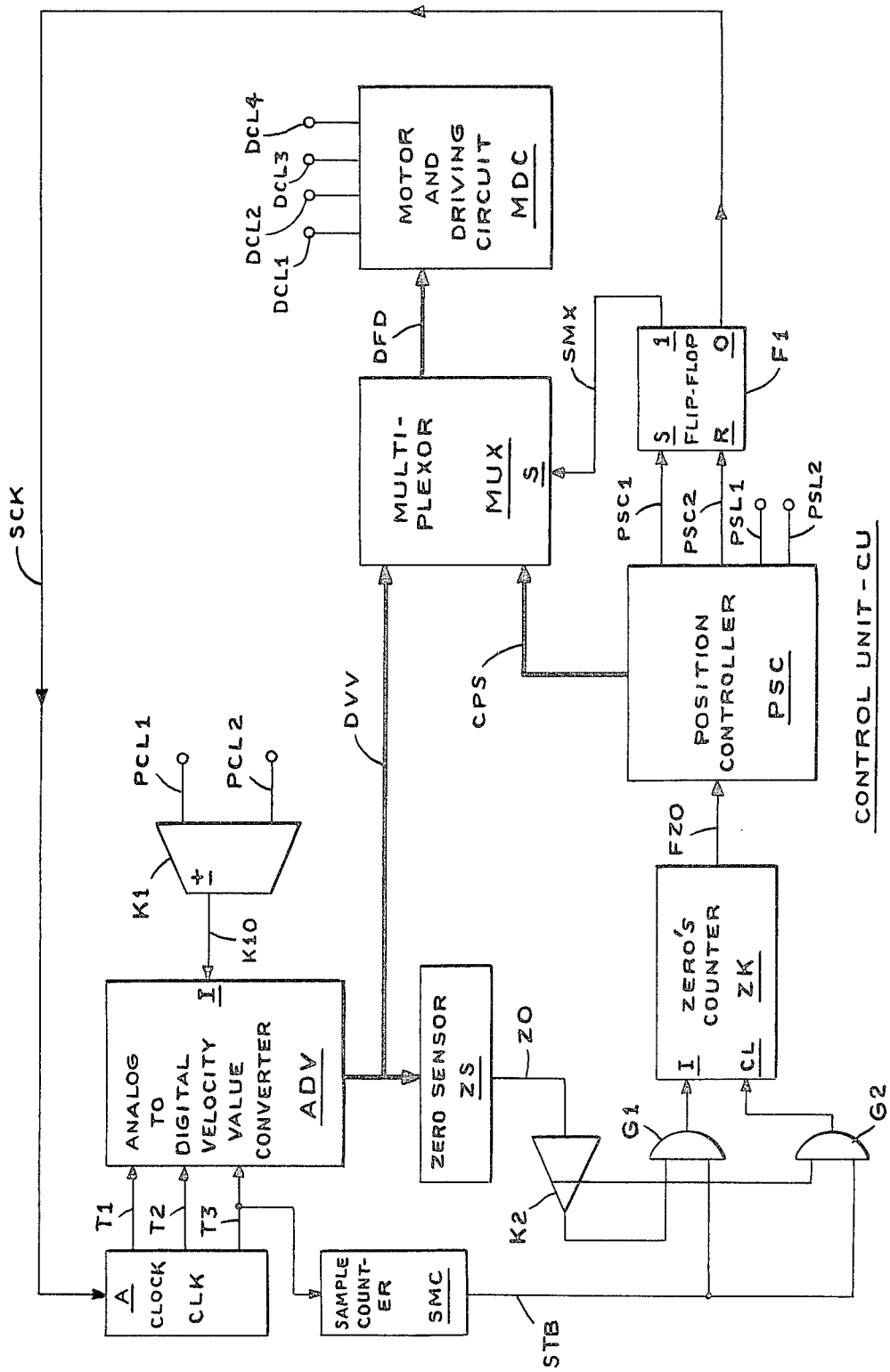
FIG. 4 is a block diagram of the control unit of FIG. 1.

In FIG. 4, the control unit CU is shown including: the motor and driving circuit MDC which receives digital values on the cable DFD to position the motor in response to the digital values received therefrom; the multiplexor MUX which supplies the signal digital values to the cable DFD from either the cable DVV or the cable CPS in response to a selection signal on the line SMX; the analog to digital velocity value converter ADV which converts pairs of successively sampled amplitudes of the signals on the lines PCL1 and PCL2 from the transducer to digital values indicating the instantaneous velocity of the rotation of the shaft; the zero sensor ZS which senses for, effectively, zero velocity signals represented by the digital values on the line DVV such that whenever a zero value is sensed it transmits an indication on the line ZO; a clock CLK which generates sets of clock pulses; a sample counter SMC which counts specific ones of the clock pulses to strobe AND-circuits G1 and G2; and a zero counter ZK which counts the zero signals received via the AND-circuits from the zero sensor ZS.

In operation, normally the position controller PSC emits a digital value on the cable CPS and at the same time a signal on the line PSC1. The signal on the line PSC1 sets the flip-flop F1 which transmits a signal on the line SMX to the select input S of the multiplexor MUX. Effectively, the multiplexor MUX then connects the cable CPS to the cable DFD so that the stepping motor is driven to the desired character position. When the stepping motor reaches the desired character position, the position controller PSC emits a signal on the line PSC2 to reset the flip-flop F1. The disappearance of the signal on line SMX causes the multiplexor MUX now to connect the cable DVV to the cable DFD. At this time, the motor is no longer actively driven. However, since it does not stop instantaneously, as described above, it starts oscillating about this stopping position. Thus, a signal having the waveforms of that shown in FIG. 3 is generated and fed via the lines PCL1 and PCL2, and amplifier K1 and line K10 to the input I of analog to digital velocity value converter ADV. The clearing of the flip-flop F1 also caused the generation of the signal on line SCK. This signal activates the clock CLK which now starts controlling the analog to digital velocity value converter ADV. This converter, in response to the sequences of timing signals T1, T2 and T3, effectively samples two values of the signal from the transducer at a fixed time interval so that a velocity calculation can be made. In particular, each signal as it is received is converted to a digital value; then the pairs of digital values are subtracted. The resulting remainder digital value (with a sign bit) is fed into a function table and converted to a digital value representing the velocity. This digital value is fed on the cable DVV to the multiplexor MUX which, in turn, feeds it via the cable DFD to the motor and driving circuit MDC. The digital value sent thereto is a function of the velocity so that the stator field is now displaced in a direction opposite to the instantaneous oscillatory movement direction by an amount related to the actual rotor velocity so that there can be a braking of the rotor. As the shaft is still rotating, the transducer is continuously sampled and the braking displacements are changed as the velocity decreases. When the velocity gets below a certain amount, its amplitude is sensed by the zero sensors ZS which emit a signal on the line ZO to the amplifier K1. At the same time, the clock pulses T3 are counted such that, say for every 16 clock pulses, the sample counter SMC emits a strobe signal on the line STB. The coincidence of the strobe signal, and the signal from the zero sensor ZS via the direct output of amplifier K2 cause the AND-circuit G1 to emit a pulse to the incrementing input I of the zeros counter ZK. After, say, four zeros have been counted, the counter ZK will emit a pulse on the line FZO to the position controller PSC indicating that the oscillations have fallen below an allowed amount. Thus, the position controller can now emit a signal on the lines PSL1 and PSL2 to fire the print solenoid; thereafter, the print controller goes through the same routine for the next character.

The zero counter K is automatically cleared whenever the strobe signal on the line STB occurs and there is no zero sensed. This is accomplished by feeding the inverting output of amplifier K1 to one input of AND-circuit G2 which is strobed by the signals on line STB. In this way, it is assured that a mere transient value of a zero sensing does not mistakenly cause the firing of the print solenoid.

There will now be described the specific elements of the control unit CU. The clock CLK is merely a gated free-running oscillator which is capable of generating three separate phases of timing pulses. It could, for example, be a gated free-running oscillator driving a three-stage shift counter. The oscillator is turned off until a signal is present at the A-input connected to the line SCK.

The sample counter SMC can be a modulo 16 counter having an input connected to the line T3 and an output connected to the line STB. With such a counter, a pulse will be present on the line STB for every 16 pulses on the line T3. The zero sensor ZS can be a multi-input decoder which is wired to decode a digital value less than a predetermined digital number. The zeros counter ZK can be, for example, a counter which yields an output signal on the line FZO for four input pulses received at its I-input. In addition, the counter has a CL-input such that when a pulse is received at said input the counter is cleared to zero. The amplifier K2 is merely an amplifier which emits a signal on its direct output connected to the input G1 and the inverse of that signal from its inverting output connected to an input of the AND-circuit G2.

The multiplexor MUX is merely the equivalent of a multi-pole single-throw switch which effectively either connects the lines of the cable DVV or the lines of the cable CPS to corresponding lines of the cable DFD. The position of the switch is controlled by the presence or the absence of the signal at the S-input connected to the line SMX.

The amplifier K1 is merely an amplifier which converts a balanced input to a single-ended output connected to the line K10.

The position controller PSC (which forms no part of the present invention) is the portion of a printer system which includes the source of the characters to be printed and conversion tables for converting the binary code for the character into a binary number for rotating the motor. In addition, the controller includes the timing for firing the print solenoid as well as the ability to emit signals to indicate when the print wheel has been nominally moved to the correct position. The details for the position controller PSC can be found in the above-mentioned U.S. Pat. No. 4,215,203.

Figure 5:
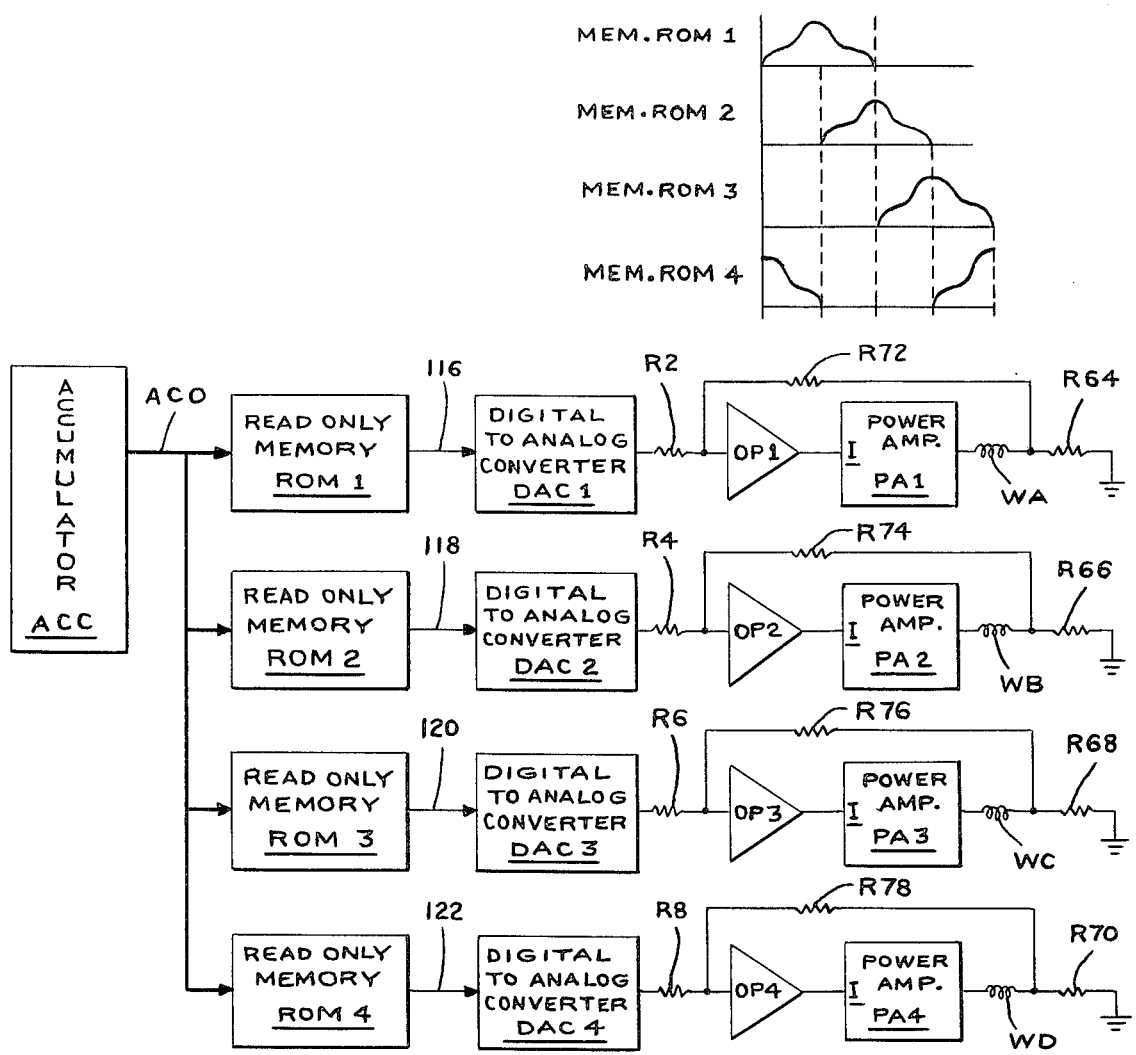
FIG. 5 is a block and schematic diagram of the stepping motor and driver of FIG. 4.

The motor and driving circuit MDC is shown in more detail in FIG. 5.

The motor and driving circuits MDC as shown in FIG. 5 are connected to cable DFD. The cable feeds the inputs of accumulator ACC. In the accumulator is stored in effect the instantaneous angular position of the stator field. As digital values get added to the stored value, the field is rotated say clockwise while subtracting values cause the field to rotate counter-clockwise. The stored value in the accumulator is in fact address for four read-only memories. (Note the accumulator ACC can be an algebraic adder-subtractor which algebraically adds to the accumulated digital value the signed digital value on the cable DFD.)

Cable ACO feeds signals or addresses in parallel to read-only-memories ROM1, ROM2, ROM3, and ROM4. These in turn are connected via respective lines to digital-to-analog converters DAC1, DAC2, DAC3 and DAC4.

The digital-to-analog converters are connected via resistors R2, R4, R6 and R8 to op amps OP1, OP2, OP3 and OP4 in turn connected to the signal inputs I of power amplifiers PA1, PA2, PA3 and PA4. The power amplifiers PA1, PA2, PA3 and PA4 are respectively connected to windings WA, WB, WC and WD which represent the four phases of a stepping motor. The number of phases is selected for illustrative purposes only and is in no way limiting of the invention.

Resistors R64, R66, R68 and R70 are sensing resistors connected between the aforesaid windings and ground and they operate in conjunction with resistors R72, R74, R76, and R78 connected in feedback relationship to the aforementioned op amplifiers OP1, OP2, OP3, and OP4.

In the memories ROM1, ROM2, ROM3 and ROM4 are pre-recorded the appropriate current profiles $I_A$, $I_B$, $I_C$, and $I_D$ (as functions of angle), the memory output data at any instant represent the instantaneous values of the winding currents. The current profiles are generated in the manner described in my above-referenced U.S. Pat. No. 4,215,302. The current profile of each memory is also shown in FIG. 5. In the case of memory ROM1, its output is converted into the analog voltage by the digital-to-analog converter DAC1. The output loop, which consists of the operational amplifier OA1, the power amplifier PA1, resistors R64, R72 and R2, drives current through the phase A motor winding WA. Since the voltage of the junction of resistors R64 and R72 is proportional to winding current, the distinct property of virtual ground of the op amp forces the motor current to be directly proportional to the digital-to-analog converter output. Thus the desired current waveforms control the position of the motor.

Figure 6:
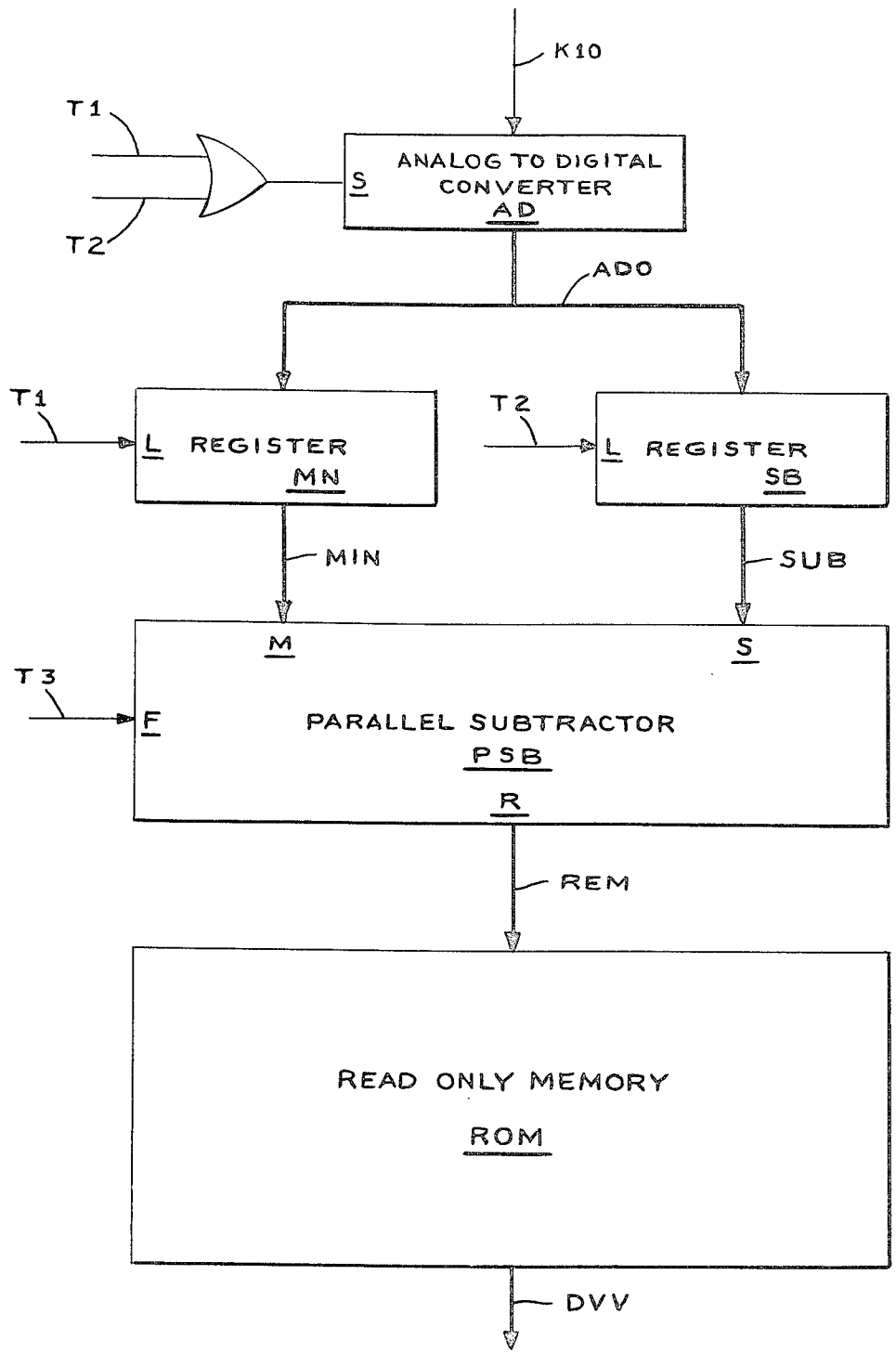
FIG. 6 is a block diagram of the analog to digital velocity value converter of FIG. 4.

In FIG. 6 there is shown the analog to digital velocity value converter ADV which receives an analog signal whose amplitude effectively represents the position of a slit of the transducer with respect to a fixed point, such as, the light source. The analog signal is fed via the line K10 to the analog digital converter ADV which is first sampled by a signal on T1 from the clock which also enables the register MN. Accordingly, the digital value at the output of the converter AD is fed via the cable ADO into the register MN, and from there, via the cable MIN to the M-input (minuend) of the parallel subtractor PSB. At the time T2, the converter AD is again sampled while the signal on line T2 also enables the register SB. Now, the digital value on the line ADO is loaded into the register SB and fed via the cable SUB to the S-input (subtrahend) of the parallel subtractor PSB. At the time T3, the signal on line T3 is received at the F-input of the subtractor SUB which performs a signed digital subtraction. The remainder digital number with the sign is fed from the R-output via the cable REM to the input of read-only memory ROM where it is used as an address to select a register. The contents of the selected register are fed via the cable DVV to the multiplexor MUX of FIG. 4.

It should be noted that the periodic sampling of the signal on line K10 and the loading of these two adjacent periodic samples into the subtractor followed by a subtraction is effectively the calculation of a velocity. It is actually the approximation of the velocity multiplied by a constant. Furthermore, as has been said above, the instantaneous velocity of the rotor is used to generate a displacement which is a function of the desired damping. Therefore, in a sense, by storing in each of the registers of a read-only memory a displacement value which is a function of the velocity one can obtain the conversion between an instantaneous velocity value and a desired rotor displacement. Thus, one stores in the read-only memory ROM displacement values wherein each displacement value is addressed by its appropriate velocity value. The above-described converter ADV in FIG. 6 concerns the presently preferred embodiment of the invention.

In another embodiment of the invention, the velocity value is converted to the slope of the potential well. Therefore, the read-only memory in this case would store a listing of drive current values. These current values would be then fed to a digital to analog converter to generate an analog signal which would control the gain of the power amplifiers PA1 to PA4 of FIG. 5. Furthermore, the accumulator of FIG. 5 would receive a digital value which basically displaced the stator field by a fixed amount instead of a variable amount based on the output of the read only memory ROM in the preferred embodiment.

Furthermore, it is also possible that instead of the continuous damping as described for the two above embodiments, there is a stepwise damping, i.e., the stator field is moved to a fixed displacement and remains at that displacement for a given period of time before shifting back to the home displacement. In such case, the system would be modified such that the signal on line K10 is continuously monitored to determine the maximum peak excursion in one direction and the maximum peak excursion in the other direction. This can be accomplished by using sample and hold circuits under the control of peak detectors. Then the two maximum values are fed into the equivalent of the registers MN and SB of FIG. 6 and from there into a parallel adder. The sum would then be divided by two. In effect, the division by two is obtainable merely by shifting the contents of the adder one bit position to the right. Thus, what would then be transmitted by the adder would be the magnitude of the maximum displacement. This digital value could then be fed into the ROM to determine what the displacement of the stator field would be such that after a known period of time the rotor would be back to the desired position with no velocity. At that time, then, the stator field would be returned to the desired position. Again, this variation can also be used not by displacing the stator field by an amount which is a function of the amplitude of rotor swing, but by a fixed amount and then the drive currents as a function of maximum rotor would be varied.

While only a limited number of embodiments have been shown and described in detail, there will now be obvious to those skilled in the art many modifications and variations satisfying many or all of the objects of the invention without departing from the spirit thereof as defined in the appended claims.

What is claimed is:

1. In a stepping motor having a rotatable stator magnetic field for driving the rotor, the method of damping the oscillations of the rotor which occur when the rotatable stator magnetic field is stopped upon arriving at a desired rotational position comprising a first step of measuring quantities related to the instantaneous velocity of the rotor due to the oscillations of the rotor about the desired rotational position, a second step of modifying the stator magnetic field by at least a rotational displacement from the desired rotational position in a direction opposite to the direction of the oscillation by an amount which is a continuous function of the instantaneous velocity, and a third step of thereafter returning the stator magnetic field to the desired stopping position.

2. The method of claim 1 wherein said measured quantities are the rotational position of the rotor.

3. The method of claim 2 wherein the amount of displacement is related to the magnitude of measured quantities.

4. The method of claim 3 wherein said third step comprises performing a set of pairs of said first and second steps such that as the measured velocity decreases the rotational displacement of the stator magnetic field converge to the desired rotational position.

5. The method of claim 2 wherein said first step comprises measuring the instantaneous positions of the rotor and periodically occurring instants of time and subtracting two successive measurements.

6. The method of claim 2 wherein said first step comprises measuring the two peak values of the rotational position of the rotor during one cycle of the oscillation.

7. The method of claim 6 wherein the amount of displacement is related to the amplitude of one of the peak values.

8. The method of claim 7 wherein said third step is performed at a time equal to one quarter of the period of oscillation of the rotor after the performance of the second step.

9. The method of claims 1, 2, 5, 6, or 7 wherein for said second step the amount of the displacement is fixed and the amplitude of the rotatable stator magnetic field is related to the magnitude of the measured quantities.

10. The method of claim 2 or 5, wherein said third step comprises performing a set of pairs said first and second steps such that as the measured velocity decreases the amplitude of the rotatable stator magnetic field converges to the magnitude normal for the stopped rotational position.

11. The method of claim 9 wherein said third step comprises perform a set of pairs said first and second steps such that as the measured velocity decreases the amplitude of the rotatable stator magnetic field converges to the magnitude normal for the stopped rotational position.

* * * * *